United States Patent
Heimann et al.

(10) Patent No.: US 9,995,331 B2
(45) Date of Patent: Jun. 12, 2018

(54) PLUG-IN COUPLING FROM COUPLING ELEMENT AND BALL STUD

(71) Applicant: BÖLLHOFF VERBINDUNGSTECHNIK GMBH, Bielefeld (DE)

(72) Inventors: Vanessa Heimann, Paderborn (DE); Alexander Vorderwisch, Bielefeld (DE)

(73) Assignee: BÖLLHOFF VERBINDUNGSTECHNIK GmbH, Bielefeld (DE)

( * ) Notice: Subject to any disclaimer, the term of this patent is extended or adjusted under 35 U.S.C. 154(b) by 181 days.

(21) Appl. No.: 15/061,496

(22) Filed: Mar. 4, 2016

(65) Prior Publication Data
US 2016/0258465 A1    Sep. 8, 2016

(30) Foreign Application Priority Data
Mar. 6, 2015   (DE) .................... 20 2015 101 103 U

(51) Int. Cl.
*F16B 21/07*   (2006.01)
*F16C 11/06*   (2006.01)
(Continued)

(52) U.S. Cl.
CPC .......... *F16B 21/07* (2013.01); *B60R 13/0206* (2013.01); *F16B 5/0621* (2013.01);
(Continued)

(58) Field of Classification Search
CPC .. F16B 21/073; F16B 21/075; F16C 11/0623; F16C 11/0657
See application file for complete search history.

(56) References Cited

U.S. PATENT DOCUMENTS 3,916,756 A * 11/1975 Yoda .................... F16B 21/073
                                                       24/682.1
4,118,131 A * 10/1978 Schnitzius .......... F16C 11/0657
                                                       200/61.62
(Continued)

FOREIGN PATENT DOCUMENTS

DE    29920379 U1    1/2000
DE    20216836 U1    2/2003
(Continued)

OTHER PUBLICATIONS

EP Search Report for EP Application No. 16158611.0 dated Jul. 8, 2016, 8 pages.
(Continued)

*Primary Examiner* — Flemming Saether
(74) *Attorney, Agent, or Firm* — Reising Ethington P.C.; Matthew J. Schmidt

(57) ABSTRACT

The present disclosure is directed to a coupling element for the releasable connection of a first component to a second component. The coupling element has an annular basic element comprising a fastening structure at a radially outer side. Further, the basic element comprises a socket-like holding structure at a radially inner side. The socket-like holding structure comprises a centrally arranged supporting element as well as a plurality of holding webs. The holding webs comprise at least a first and a second web section. The first web section encloses with an axis of symmetry S of the coupling element an angle $\alpha$ from a range of $45° \leq \alpha \leq 90°$ and the first web section and the second web section are arranged in an obtuse angle with respect to each other.

20 Claims, 2 Drawing Sheets

Figure 1:
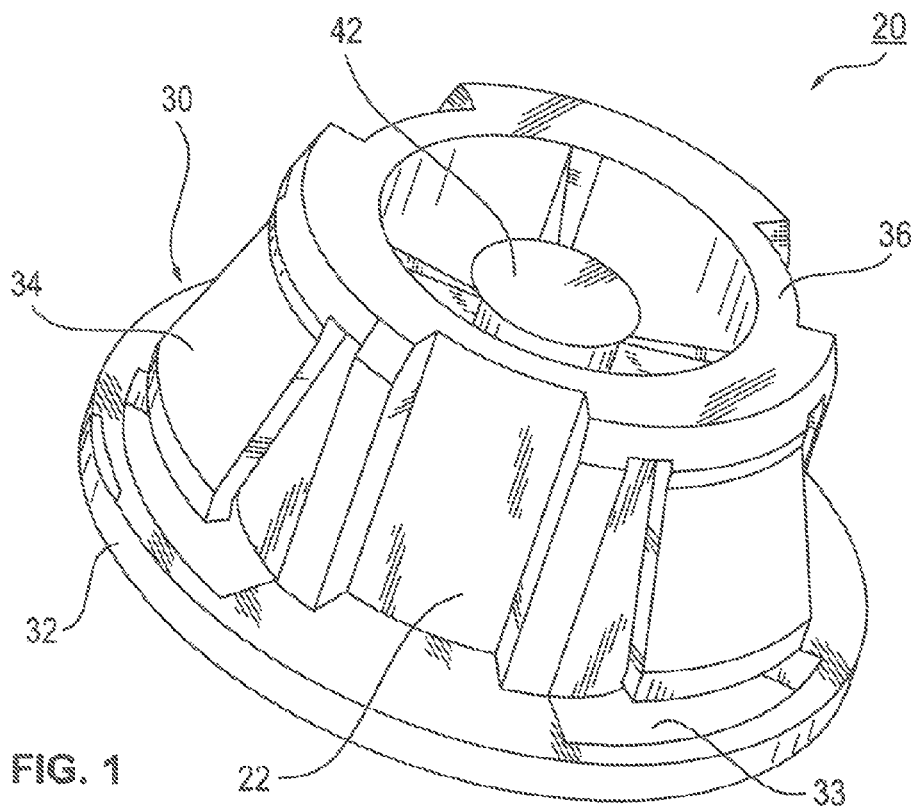

(51) Int. Cl.
  *B60R 13/02* (2006.01)
  *F16B 5/06* (2006.01)

(52) U.S. Cl.
  CPC .......... *F16B 21/075* (2013.01); *F16C 11/069* (2013.01); *F16C 11/0657* (2013.01); *F16C 11/0695* (2013.01)

(56) References Cited

U.S. PATENT DOCUMENTS

| | | | |
|---|---|---|---|
| 4,176,428 A | 12/1979 | Kimura | |
| 5,032,965 A * | 7/1991 | Weber | B60Q 1/0683 362/428 |
| 5,297,322 A * | 3/1994 | Kraus | F16B 21/073 24/297 |
| 5,580,204 A | 12/1996 | Hultman | |
| 5,653,548 A * | 8/1997 | Amdahl | F16C 11/0657 403/122 |
| 6,206,604 B1 | 3/2001 | Dembowsky et al. | |
| 6,758,622 B2 | 7/2004 | Burton | |
| 6,837,716 B1 * | 1/2005 | Brazas | B60Q 1/06 403/122 |
| 6,945,682 B2 * | 9/2005 | Cramer | B60Q 1/068 362/515 |
| 7,168,879 B2 | 1/2007 | Bertram et al. | |
| 9,140,294 B2 * | 9/2015 | Burton | F16C 11/06 |
| 9,261,129 B2 * | 2/2016 | Herrema | F16L 41/12 |
| 2011/0123294 A1 * | 5/2011 | Kempf | F16B 2/005 411/508 |
| 2013/0236238 A1 | 9/2013 | Burton | |
| 2015/0232016 A1 | 8/2015 | Burton | |

FOREIGN PATENT DOCUMENTS

| | | |
|---|---|---|
| DE | 102013102197 A1 | 9/2013 |
| EP | 0902198 B1 | 4/2003 |

OTHER PUBLICATIONS

CN Office Action (cover sheet) for CN Application No. 201610128553.4 dated Sep. 27, 2017, 1 page.

* cited by examiner

PLUG-IN COUPLING FROM COUPLING ELEMENT AND BALL STUD

1. CROSS REFERENCE TO RELATED APPLICATIONS

This application claims the priority of German patent application No. DE 202015101103.2, filed on Mar. 6, 2015. The entire content of this priority application is incorporated herein by reference in its entirety.

2. TECHNICAL FIELD

The present disclosure is related to a plug-in coupling for the releasable or detachable connection of a first component with a second component, wherein the plug-in coupling is constructed from a coupling element and a ball stud.

3. BACKGROUND

In the prior art, a variety of plug-in couplings are known, which serve the connection of two components. Depending on the construction of the plug-in coupling, which cooperates mostly with a ball stud or ball pin, and the material choice thereof, different connection properties are realized. The terms ball stud and ball pin are used synonymously. They designate an elongated pin-like component having a ball-shaped end.

DE 299 20 379 U1 and EP 0 902 198 B1 describe plug-in couplings, which can dampen oscillations of the components due to their construction and the elastic material of which they consist. This is realized especially by a certain movability of the ball head after it has been snapped into the coupling with the ball socket encompassing it.

U.S. Pat. No. 4,176,428 describes a similar construction. By means of this plug-in coupling, and similar to DE 299 20 379 U1 or U.S. Pat. No. 5,580,204, a cladding part is attached to a supporting part, for example a frame structure of a motor vehicle. Cladding parts are mostly components having a low weight and a certain flexibility. Therefore, the coupling is less complex in its stability compared to the fastening of rigid and heavy parts. Further, especially at cladding parts, oscillations must be dampable, which is ensured by the flexibility and elasticity of the coupling material.

U.S. Pat. No. 4,176,428 describes for this purpose a coupling with two ball spaces or ball sockets connected in series, into which the ball head of the ball stud can snap-in. The first ball socket determines a connection between coupling and ball head for pre-mounting the two components while the second ball socket determines the final fastening position between coupling and ball head. Altogether, these plug-in couplings are not suitable for the connection of rigid, large and heavy components, as the oscillation behavior thereof would cause an uncontrolled loosening or detaching of the plug-in coupling.

A further type of plug-in coupling, which is especially suitable for mechanically loaded connections, is described in U.S. Pat. No. 5,653,548 and DE 10 2013 102 197 A1. The here described couplings receive the ball head in that the ball head snaps-in behind webs, which are inclined in insertion direction. The webs abut the ball head and are attached or fastened at the coupling on one side. During the attempt to remove the ball head from the coupling, they are pivoted against the insertion direction. This leads to the webs blocking the inlet and outlet opening of the coupling due to their length and the only limited pivotability. Therefore, the connection between ball head and coupling can only be released by destroying the coupling. This is especially disadvantageous in case of the necessity of releasing a connection, as the coupling has to be replaced subsequently.

It is therefore an object of at least some implementations of the present invention to provide a plug-in coupling for connecting two components, which is mechanically highly loadable and releasable or detachable at the same time. Especially, a plug-in coupling that can reliably and releasably fastening heavy components at each other, preferably having a mass about 500 g, being exposed to the stresses of mechanical oscillations in the range of about 0 to 200 Hz.

4. SUMMARY

The above object, among others, is solved by a coupling element according to the independent claim 1, by a plug-in coupling according to claim 9, by a connection between two components by means of the plug-in coupling according to claim 10 as well as by an injection moulding method for a coupling element according to claim 11. Advantageous embodiments and developments result from the detailed description, the drawings as well as the appending claims.

The inventive plug-in coupling serves for the releasable or detachable connection of a first component with a second component. This plug-in coupling comprises a coupling element and a ball stud. The coupling element comprises the following features: the coupling element is constructed in one piece from plastic and having an annular basic element forming a receiving opening for a ball stud, and which comprises a fastening structure at a radially outer side of the basic element by means of which the coupling element is fastenable in an opening of the first component, and that comprises a socket-like holding structure at a radially inner side of the basic element, in which a ball-shaped end of the ball stud can snap-in and from which the ball-shaped end is detachable without damaging the holding structure, wherein the socket-like holding structure comprises: a centrally arranged supporting element at which the ball-shaped end of the ball pin can be supported as well as a plurality of holding webs, one side of which is integrally connected to the annular basic element, which protrude into the coupling element resiliently radially inwardly and inclined in an insertion direction of the ball stud, wherein the holding webs comprise at least a first and a second web section which are oriented angularly with respect to each other, which extend preferably straight, and which are connected to each other, wherein the first web section encloses with an axis of symmetry of the coupling element an angle $\alpha$ in a range of $45° \leq \alpha \leq 90°$ and the first web section and the second web section are arranged in an obtuse angle with respect to each other.

The present plug-in coupling serves for connecting a first and a second component, wherein the one component is for example connected via a component opening with the one-piece coupling element and the other component is connected to the ball stud or ball pin. Ball stud or ball pin denote in this context a pin-like arrangement, one end of which is fastened at the component, for example by means of screwing, riveting or gluing, and the other end of which comprises a ball-shaped shape, for example a ball head or an oval head. While the ball stud is a standard component made of plastic or metal, the coupling element is adapted to the desired connection properties between the first and the second component due to its constructive design.

For ensuring an effective manufacturing of the coupling element, the coupling element is made of plastic in one piece preferably by an injection moulding method. The coupling element consists of an annular or ring-shaped basic element, wherein the socket-like holding structure for the ball stud is arranged in the radial interior of the basic element and wherein the fastening structure for the coupling element in the first component is arranged at the radially outer side. For being able to arrange the ball-shaped end of the ball stud reliably and detachably within the socket-like holding structure, this holding structure comprises a centrally arranged supporting element. At this supporting element, the ball-shaped end of the ball stud abuts after it has been snapped into the holding structure.

This position of the ball-shaped end of the ball stud is ensured by a plurality of holding webs arranged equally spaced in circumferential direction of the basic element. These holding webs are formed or attached only one-sided to the basic element, so that their free end protrudes resiliently in radial direction into the radial interior of the coupling element. Further, these holding webs are arranged inclined in insertion direction, i.e. in the direction of the centrally arranged supporting element, if the course or route direction of the single holding webs is compared with the axis of symmetry of the coupling element. The flexibility and arrangement of the holding webs in radial direction ensures that the ball-shaped end of the ball stud locks into the holding structure but can also be released therefrom again. Especially the angular division into two of the holding webs into a first and a second web section and the corresponding orientation in the space and with respect to the ball head to be inserted ensures a reliable but destruction-free detachable connection. For this purpose, the ball-shaped end does especially not pivot the holding webs into the direction of the receiving opening of the coupling element during releasing from the holding structure, whereby the receiving opening would be blocked. This property of the holding webs is achieved by an obtuse-angled arrangement of the first and the second web section with respect to each other. This means that the web sections enclose at their radial inner side with respect to the coupling element an angle, the size of which is between 90° and 180°. Besides this obtuse-angled arrangement of the first and the second web section with respect to each other, especially the first web section, which would abut at the ball-shaped end of the ball stud when inserted into the coupling element, is arranged in a specific angle with respect to the axis of symmetry of the coupling element. Especially, the first web section extends in an angular range of $45°\leq\alpha\leq90°$ in the direction of the ball-shaped end of the ball stud. The angular orientation of the first web section ensures a sufficient transmission of high holding forces to the ball-shaped end of the ball stud. The angular orientation of the second web section as well as the orientation of the first and the second web section with respect to each other ensure that especially during releasing of the ball stud from the coupling element, the holding webs are not compressed but displaced radially to the outside. At this, the ends of the first web section abutting at the ball-shaped end of the ball stud slide over the surface of the ball-shaped ends, so that the holding webs are neither pivoted in the direction of the receiving opening nor compressed in their longitudinal direction. These characteristics of the web sections are supported in that the web sections preferably extend straight with respect to their respective longitudinal axis.

According to an embodiment, the ball-shaped end of the inserted ball stud is abuttable by means of a radial inner end of the first web section with respect to the plug-in coupling and the second web section is formed longer as the first web section.

A variable length scale of the first and second web sections makes an adaption of the engaging point of the first web section at the ball-shaped end of the ball stud possible. At the same time, also specifically by means of the length scale of the web sections and the angular arrangement of the web sections within the coupling element, the holding force is determined by means of which the webs press the ball-shaped end against the socket-like holding structure. Further, the constructive designs influence advantageously the evading behavior of the holding webs during inserting and releasing of the ball head from the holding structure.

According to a further preferred embodiment, the first web section encloses with the axis of symmetry of the coupling element an angle $\alpha$ in the range of 45° to 60°, preferably 55° to 60°. Further preferred, the first and the second web section enclose the already above mentioned obtuse angle $\gamma$ with a size of $90°<\gamma<180°$, further preferred $90°<\gamma<140°$.

According to a further preferred embodiment, the plug-in coupling comprises a plurality of radial leading webs, preferably three leading webs equally distributed in circumferential direction, which connect the annular basic element and the socket-like supporting structure to each other.

These leading webs guide the ball-shaped end of the ball stud during the inserting and releasing movement into or out of the coupling element. Further, they give a radial stabilization for the ball-shaped end within the coupling element additionally to the first web sections engaging at the ball-shaped end. Thus, the mechanical loads of the ball-shaped end of the ball stud are transferred via the radial leading webs to the annular basic element and, thus, to the component.

According to a further preferred embodiment, a fastening structure for the coupling element is provided at the basic element, wherein the fastening structure comprises a flange, which protrudes radially outwardly and extends around the basic element, as well as a plurality of locking webs, which are attached or fastened with one side at the coupling element, i.e. integrally formed with the coupling element, and which are arranged inclined against an insertion direction of the ball pin into the coupling element. This preferred fastening structure ensures that the coupling element can be locked in a component opening with low effort. Because as soon as the coupling element is inserted into the opening adapted to the outer diameter of the basic element, the circumferential flange ensures that the coupling element is received in the opening until abutment between circumferential flange and component occurs. During this inserting, the locking webs are pressed radially inwardly in the direction of the basic element, so that the coupling element can move through the opening of the component. As soon as the circumferential flange abuts the component, the locking webs are moved resiliently radially outwardly, so that the coupling element is held between locking webs and circumferential flange. The coupling element now cannot be moved out of the opening in the component against the insertion direction, as the locking webs, which had been moved resiliently radially outwardly, form an undercut against this movement.

According to a further preferred embodiment, the circumferential flange and the locking webs are connected to each other by means of an annular circumferential wall. This connection gives additional stability to the coupling element. Preferably, the locking webs abut at the annular circumferential wall at which also the supporting webs are formed at the radial inner side in axial direction spaced from the circumferential flange and circumferentially equally distributed. In this way, a possible mechanical load of the established connection is not transferred solely to the basic element. The mechanical load is distributed by means of the annular circumferential wall to the complete coupling as, for example, mechanical loads of the locking webs are transferred via the circumferential wall preferably also to the radial leading webs and, thus, to the ball stud.

Preferably, the plug-in coupling consists of plastic, according to a preferred embodiment of a thermoplastic elastomer or of a mixture of such elastomers or of elastomer (rubber) or of silicone. The used plastic has also preferably a shore hardness in the range of 50 to 90 shore A, wherein here depending on the application also other hardnesses are usable. According to an embodiment, the used plastic is reinforced by fillers.

Further provided may be a first and a second component, in which the first component comprises in a component opening the coupling element according to the above described embodiments and the second component comprises a ball stud, the ball-shaped end of which is fastened in the coupling element.

Further provided a manufacturing method for the above described plug-in coupling by means of an injection moulding method, wherein the plug-in coupling is formed or moulded as a part of plastic. Correspondingly, the injection mould provides the above described constructive features of the coupling element as negative and with plastic fillable mould features.

Furthermore, the present disclosures describes an injection moulding method for a coupling element of a plug-in coupling comprising the following steps: providing an injection mould having the complementary features of the inventive coupling element, injection moulding of the coupling element in the injection mould, cooling down of the coupling element and de-moulding the coupling element from the injection mould.

5. SHORT DESCRIPTION OF THE ACCOMPANYING DRAWINGS

Figure 2:
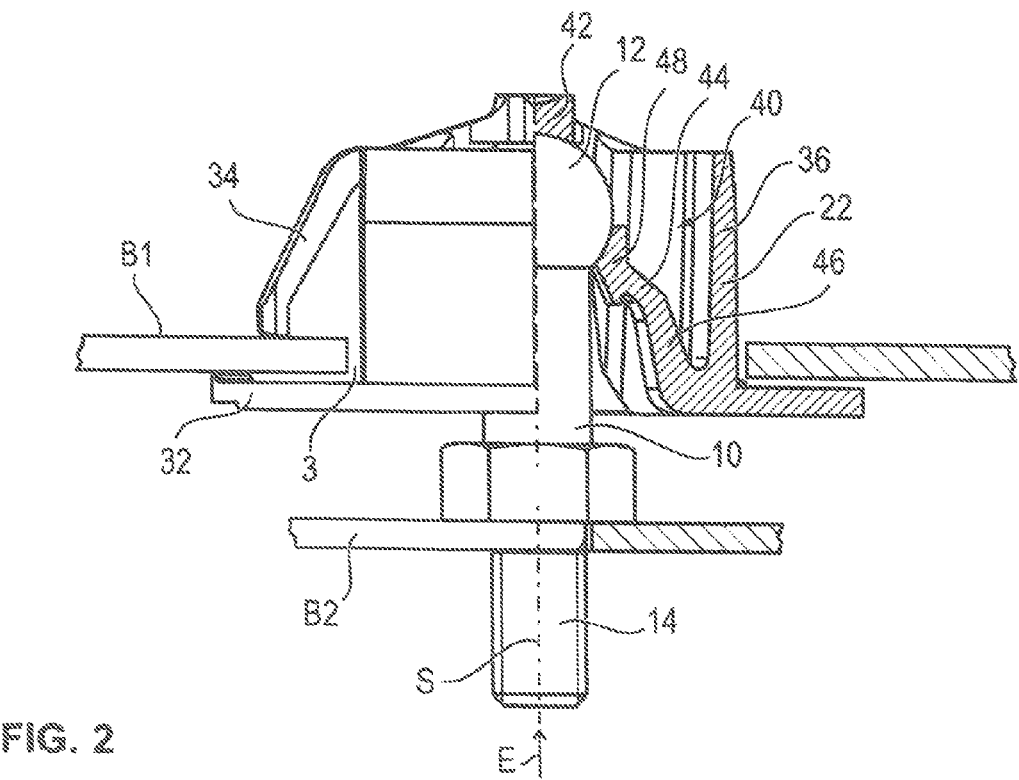
Figure 3:
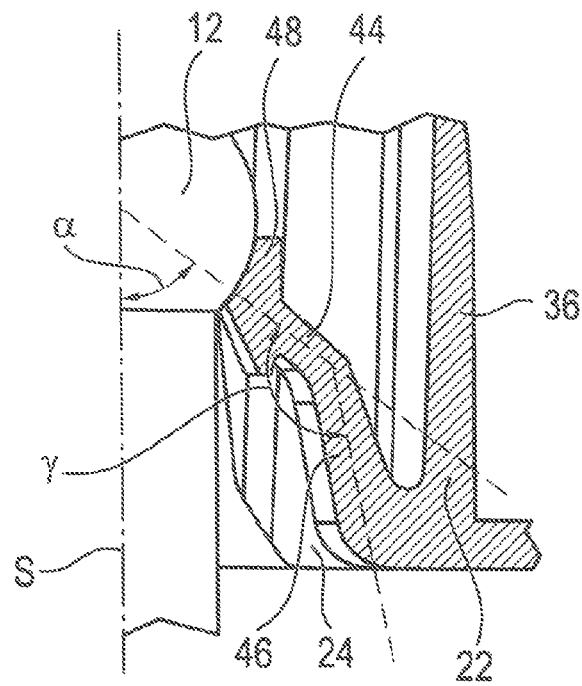
Figure 4:
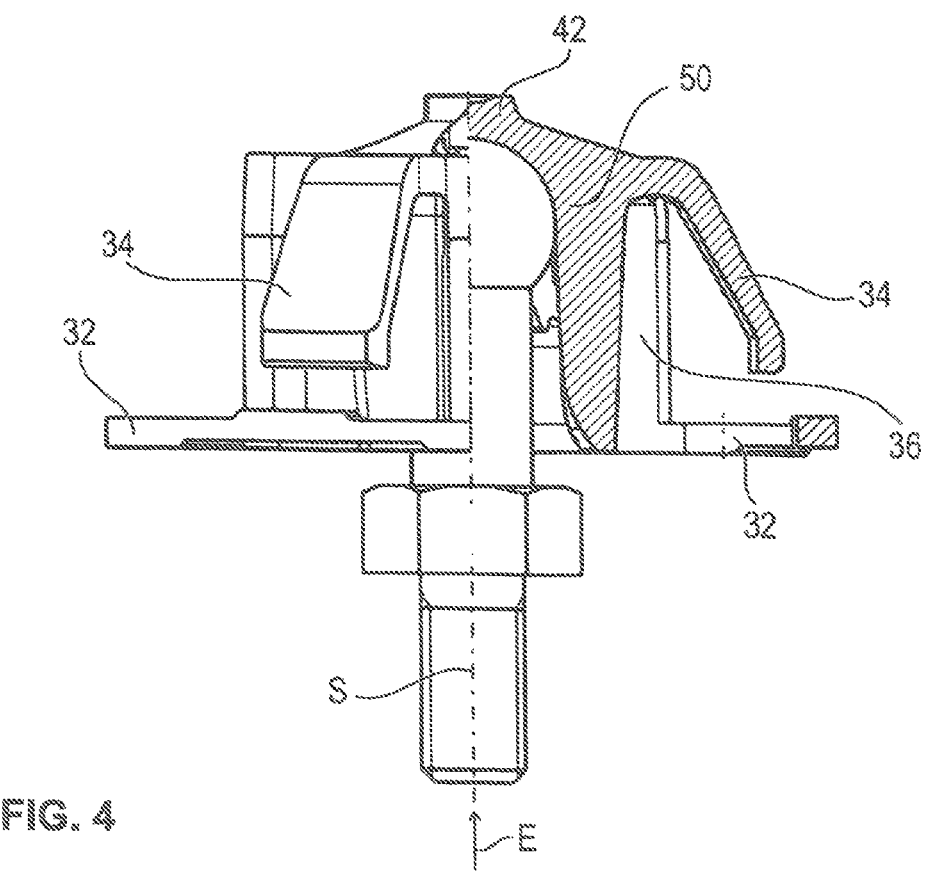

Some implementations of the present invention is explained in detail with reference to the accompanying drawings. It shows:

FIG. 1 a perspective view of a preferred embodiment of the coupling element,

FIG. 2 a partly cross-sectional view of a preferred embodiment of the coupling element with inserted ball stud, FIG. 3 a sectional enlargement of the depiction according to FIG. 2 and FIG. 4 a further partly cross-sectional view of a preferred embodiment of the coupling element with inserted ball stud.

6. DETAILED DESCRIPTION OF THE PREFERRED EMBODIMENTS

FIG. 1 shows a preferred embodiment of a plug-in coupling, wherein here only the coupling element 20 is shown in a perspective view. The coupling element is a one-piece plastic part, which is produced by means of injection moulding. Correspondingly, an injection mould is filled with plastic, which defines the features of the coupling element 20 described in detail below. After injection moulding and cooling of the coupling element 20, the coupling element 20 is demoulded.

Preferably, the plastic of the coupling element 20 has in the cooled-down condition a shore hardness in the range of 20 to 120 shore A, preferably 20 to 90. At preferred fiber reinforced plastics, the characteristics of the fiber material (fillers) and the shape, size and distribution of the fibers influence the mechanical properties of the material.

Further preferred, the coupling element 20 produced in one piece consists of thermoplastic elastomer, as for example polyamide (PA), polypropylene (PP), polyoxymethylene (POM), polycarbonate (PC) or acrylonitrile butadiene styrene (ABS) or combinations thereof. The used plastic is preferably provided with or without additives, like glass fibers, glass balls and the like. Alternatively, also duromers are usable.

The one-piece coupling element 20 of plastic comprises an annular basic element 22. According to an embodiment of the coupling element, an annular circumferential wall 36 extends from the basic element 22, wherein the wall 36 encloses a socket-like holding structure 40. At the radial outer side of the basic element 22 and preferably at the wall 36, a fastening structure 30 is arranged by means of which the coupling element 20 is fastenable in an opening 3 of the first component B1 (see FIG. 2).

The fastening structure 30 comprises a flange 32 extending radially outwardly. The flange 32 is arranged circumferentially around the fastening element 22. After inserting the coupling element 20 into the component opening 3, the flange 32 abuts at the bottom side of the first component B1, as it is shown in FIGS. 2 and 4. The bottom side of the component B1 is, thus, the side facing the flange 32 and the second component B2. To this end, the outer diameter of the flange 32 is larger as the inner diameter of the opening 3 in component B1. Further, the flange 32 is preferably formed circumferentially-closed. According to a further embodiment shown in FIG. 1, the flange 32 comprises openings 33. According to a further not shown embodiment, the flange 32 consists of a plurality of radial webs, which are not connected with each other in circumferential direction.

Opposite to the flange 32, a plurality of locking webs 34 is arranged. Preferably, the locking webs 34 are provided at the wall 36 equally distributed in circumferential direction. For ensuring a locking of the coupling element 20 in the component opening 3, the locking webs 34 are fastened with one side at the wall 36 and extend against the insertion direction E. The locking webs 34 are inclined with respect to the axis of symmetry S so that they can move resiliently radially inwardly upon a radial mechanical load during the inserting of the coupling element 20 into the component opening 3. As soon as the coupling element 20 is inserted completely into the component opening 3, the locking webs 34 spring back into their initial position. In this condition, the first component B1 is clamped between the locking web 34 and the circumferential flange 32.

Preferably, the locking webs 34 are fastened adjacent to the axial end of the circumferential wall 36 facing away from the flange 32 or they are fastened near it.

In the radial interior of the basic element 22, the socket-like holding structure 40 is provided for fastening the ball-shaped end 12 of the ball stud 10. The ball stud 10 is also often denoted as ball pin. The ball-shaped end 12 denotes each structure which can be fastened in the holding structure as, for example, a ball head, a flattened or oval or elliptical head, just to name a few examples.

The ball-shaped end 12 abuts at a centrally arranged supporting element 42 after the inserting of the ball stud 10 into the coupling element 20. The supporting element 42 forms an areal element, which is preferably formed complementary to the shape of the ball-shaped end 12. Here, also other shapes are preferred which realize a supporting function for the ball-shaped end 12. Correspondingly, the supporting element 42 may also provide only a punctual abutment for the ball-shaped end 12, if a sufficient radial supporting by means of further elements of the holding structure 40 is realized as for example by holding webs (see below).

In the inserted state, the ball-shaped end 12 is pressed by a plurality of holding webs 44, 46 against the supporting element 42 and held in position. The holding webs 44, 46 are fastened with one side at the annular basic element 22 and are preferably equally distributed in circumferential direction. The holding webs 44, 46 extend in insertion direction E and are arranged inclined with respect to the axis of symmetry S.

As can be seen based on FIGS. 2 and 3, each holding web comprises at least a first 44 and a second web section 46, which are arranged angularly with respect to each other. The second web section 46 is preferably connected to the basic element 22 and merges angularly into the first web section 44. The first web section 44 has a radial inner end 48. Preferably, the radial inner end 48 is formed as abutment element which abuts at the ball-shaped end 12 and transfers the mechanical supporting and holding forces of the holding webs 44, 46 to the ball-shaped end 12.

According to a preferred embodiment, the end 48 comprises at least one abutment surface 48a which supports the ball head 12 in the inserted condition. The abutment surface 48a is preferably formed complementary to the abutting surface of the ball head 12, for example like a ball segment. At least, the abutment surface 48a is arranged preferably in an angle of 30° to 60° with respect to the insertion direction E or the axis of symmetry S.

Further preferred, the end 48 comprises an inserting aid 48h. The inserting aid 48h is also an areal element, which forms in combination with the inserting aid 48h of the other holding webs 44, 46 an insertion funnel for the ball head 12 into the holding structure 40. For this purpose, the inserting aid 48h encloses preferably an angle less than 45° with the axis of symmetry.

In FIG. 3, the preferably linearly extending web sections 44, 46 of FIG. 2 are shown enlarged. The linear course is related to the longitudinal axis of the respective web section 44, 46. The angular arrangement of the web sections 44, 46 with respect to the axis of symmetry S and with respect to each other was chosen to ensure an inserting, a mechanically stressable or loadable holding and a destruction-free removing of the ball-shaped end 12 from the holding structure 40.

To this end, the first web section 44 is arranged in an angle $\propto$ with respect to the axis of symmetry S, so that an ideal transmission of the mechanical holding forces of the holding webs 44, 46 to the ball-shaped element 12 occurs. The angle $\propto$ is measured between the longitudinal axes of the web sections 44, 46. It has a size in the range of 45° to 60°, preferably 55° to 60° and at most preferred of 57.5°.

For ensuring that the holding webs 44, 46 are moved radially outwardly during the removing of the ball-shaped end 12 from the holding structure 40, an obtuse angle $\gamma$ is provided between the first 44 and the second web section 46. The angle $\gamma$ has a size in the range of 90°<$\gamma$<180°, preferably 110°<$\gamma$<165°.

In this context, it is further preferred that the first web section 44 is formed shorter or equal to the second web section 46. By means of this length variation of the web sections 44, 46, the size and direction of the radial inwardly directed holding force of the holding webs 44, 46 is adjustable.

Due to this obtuse angled arrangement, the holding web 44, 46 is not compressed or deformed radially inwardly during the removing of the ball-shaped end 12. This makes possible a destruction-free connecting and releasing of the connection of coupling element 20 and ball stud 10.

Further preferred, the holding structure comprises a plurality of radially leading webs 50, which are arranged equally distributed at the circumference. The radial leading webs 50 connect the basic element 22 and the supporting element 42. At the same time, the radially inner face side of the single leading web 50 is arranged such that it provides a radially outer support for the ball-shaped end 12 of the ball stud 10. Accordingly, the leading web 50 is formed rounded or complementary to the ball-shaped end 12 adjacent to the supporting element 42 to be adapted to the shape of the ball-shaped end 12. It is also preferred to provide three, four or five leading webs 50, which each alternate in circumferential direction with a holding web 44, 46.

EMBODIMENTS

1. Coupling element 20 of a plug-in coupling for the releasable connection of a first component B1 to a second component B2, in which a ball stud 10 is receivable in the coupling element 20, and which comprises the following features:
   a. the coupling element 20 is constructed in one piece of plastic having an annular basic element 22 forming a receiving opening 24 for the ball stud 10 and that
      a1. comprises a fastening structure 30 at a radially outer side of the basic element 22 by means of which the coupling element 20 is fastenable in an opening 3 of the first component B1, and that
      a2. comprises a socket-like holding structure 40 at a radially inner side of the basic element 22, in which a ball-shaped end 12 of the ball stud 10 can snap-in and from which the ball-shaped end 12 is detachable without damaging the holding structure 40, wherein
   b. the socket-like holding structure 40 comprises:
      a centrally arranged supporting element 42 at which the ball-shaped end 12 of the ball stud 10 can abut, as well as
      a plurality of holding webs 44, 46 integrally formed at one side with the annular basic element 22, wherein the holding webs 44, 46 protrude resiliently radially inwardly and inclined in an insertion direction E of the ball stud 10 into the coupling element 20, wherein
      the holding webs 44, 46 comprise at least a first 44 and a second, preferably which are connected to each other, wherein the first web section 44 encloses with an axis of symmetry S of the coupling element 20) an angle $\propto$ from a range of 45°≤$\propto$≤90° and the first web section 44 and the second web section 46 are arranged in an obtuse angle with respect to each other.
2. Coupling element according to embodiment 1, in which the ball-shaped end 12 of the ball stud 10 can be abutted by a radial inner end 48 of the first web section 44 with respect to the coupling element and the second web section 46 is formed longer as the first web section 44.
3. Coupling element according to embodiment 1 or 2, in which the first web section 44 encloses with the axis of symmetry S of the coupling element 20 the angle ∝ from the range of 45° to 60°, preferably 55° to 60°.
4. Coupling element according to one of the preceding embodiments, in which the first 44 and the second web section 46 enclose an angle γ of 90°<γ<180°.
5. Coupling element according to one of the preceding embodiments, comprising a plurality of radial leading webs 50, preferably three leading webs equally distributed in circumferential direction, which connects the annular basic element 22 and the socket-like support structure 42 with each other.
6. Coupling element according to one of the preceding embodiments, at the basic element 22 of which the fastening structure 30 for the coupling element is provided, which comprises a flange 32, which protrudes radially outwardly and extends circumferentially around the basic element 22, as well as a plurality of locking webs 34 which are attached with one side at the coupling element 20 and which are inclined against an insertion direction E of the ball pin 10 into the coupling element (20).
7. Coupling element according to embodiment 6, in which the circumferential flange 32 and the locking webs 34 are connected to each other by means of an annular circumferential wall 36.
8. Coupling element according to one of the preceding embodiments, which consists of a plastic having a shore hardness in the range of 50 to 90 shore A.
9. Plug-in coupling having a coupling element according to one of the preceding embodiments and a ball stud 10.
10. Connection of a first B1 and a second component B2, in which the first component B1 comprises the plug-in coupling according to one of the preceding embodiments 1 to 8 and the second component B2 comprises a ball stud 10, the ball-shaped end 12 of which is fastened or fastenable in the plug-in coupling.
11. Injection moulding method for a coupling element 20 of a plug-in coupling comprising the following steps:
providing an injection mould having the complementary features of the coupling element according to one of the embodiments 1 to 8,
injection moulding of the coupling element in the injection mould,
cooling down of the coupling element and
de-moulding the coupling element from the injection mould.

LIST OF REFERENCE SIGNS

B1 first component
B2 second component
3 opening in the first component
10 ball pin/ball stud
12 ball-shaped end
14 fastening end of the ball stud
20 coupling element
22 basic element
24 receiving opening
30 fastening structure
32 flange
33 opening
34 locking web
36 annular circumferential wall
40 socket-like holding structure
42 centrally arranged supporting element
44, 46 holding web
44, 46 web section
48 radial inner end
48a abutment surface
48h inserting aid
50 radial leading web
S axis of symmetry of the coupling element 20
E insertion direction of the ball-shaped element into the coupling element
∝, γ angle

The invention claimed is:
1. Coupling element of a plug-in coupling for the releasable connection of a first component to a second component, in which a ball stud is receivable in the coupling element, and which comprises the following features:
   a. the coupling element is constructed in one piece of plastic having an annular basic element forming a receiving opening for the ball stud and that
     a1. comprises a fastening structure at a radially outer side of the basic element by means of which the coupling element is fastenable in an opening of the first component, and that
     a2. comprises a socket-like holding structure at a radially inner side of the basic element, in which a ball-shaped end of the ball stud can snap-in and from which the ball-shaped end is detachable without damaging the holding structure, wherein
   b. the socket-like holding structure comprises:
     a centrally arranged supporting element at which the ball-shaped end of the ball stud can abut, as well as
     a plurality of holding webs integrally formed at one side with the annular basic element, wherein the holding webs protrude resiliently radially inwardly and inclined in an insertion direction of the ball stud into the coupling element, wherein
     the holding webs comprise at least a first and a second, preferably straight, web section which are arranged angularly with respect to each other and which are connected to each other, wherein the first web section encloses with an axis of symmetry of the coupling element an angle α from a range of 45°≤α≤90° and the first web section and the second web section are arranged in an obtuse angle with respect to each other.
2. Coupling element according to claim 1, in which the ball-shaped end of the ball stud can be abutted by a radial inner end of the first web section with respect to the coupling element and the second web section is formed longer as the first web section.
3. Coupling element according to claim 2, in which the first web section encloses with the axis of symmetry of the coupling element the angle α from the range of 45° to 60°, preferably 55° to 60°.
4. Coupling element according to claim 2, in which the first and the second web section enclose an angle γ of 90°<γ<140°.
5. Coupling element according to claim 2, comprising a plurality of radial leading webs, preferably three leading webs equally distributed in circumferential direction, which connects the annular basic element and the socket-like support structure with each other.
6. Coupling element according to claim 2, at the basic element of which the fastening structure for the coupling element is provided, which comprises a flange, which protrudes radially outwardly and extends circumferentially around the basic element, as well as a plurality of locking webs, which are attached with one side at the coupling element and which are inclined against an insertion direction of the ball pin into the coupling element.

7. Coupling element according to claim 6, in which the circumferential flange and the locking webs are connected to each other by means of an annular circumferential wall.

8. Coupling element according to claim 2, which consists of a plastic having a shore hardness in the range of 50 to 90 shore A.

9. Coupling element according to claim 1, in which the first web section encloses with the axis of symmetry of the coupling element the angle $\alpha$ from the range of 45° to 60°, preferably 55° to 60°.

10. Coupling element according to claim 9, in which the first and the second web section enclose an angle $\gamma$ of $90° < \gamma < 140°$.

11. Coupling element according to claim 9, comprising a plurality of radial leading webs, preferably three leading webs equally distributed in circumferential direction, which connects the annular basic element and the socket-like support structure with each other.

12. Coupling element according to claim 9, at the basic element of which the fastening structure for the coupling element is provided, which comprises a flange, which protrudes radially outwardly and extends circumferentially around the basic element, as well as a plurality of locking webs, which are attached with one side at the coupling element and which are inclined against an insertion direction of the ball pin into the coupling element.

13. Coupling element according to claim 1, in which the first and the second web section enclose an angle $\gamma$ of $90° \leq \gamma \leq 140°$.

14. Coupling element according to claim 1, comprising a plurality of radial leading webs, preferably three leading webs equally distributed in circumferential direction, which connects the annular basic element and the socket-like support structure with each other.

15. Coupling element according to claim 1, at the basic element of which the fastening structure for the coupling element is provided, which comprises a flange, which protrudes radially outwardly and extends circumferentially around the basic element, as well as a plurality of locking webs, which are attached with one side at the coupling element and which are inclined against an insertion direction of the ball pin into the coupling element.

16. Coupling element according to claim 15, in which the circumferential flange and the locking webs are connected to each other by means of an annular circumferential wall.

17. Coupling element according to claim 1, which consists of a plastic having a shore hardness in the range of 50 to 90 shore A.

18. Plug-in coupling having a coupling element according to claim 1, and a ball stud having a ball shaped end that is fastened or fastenable in the coupling element.

19. Connection of a first and a second component, in which the first component comprises a coupling element according to claim 1, and the second component comprises a ball stud, the ball-shaped end of which is fastened or fastenable in the coupling element.

20. Injection moulding method for a coupling element of a plug-in coupling comprising the following steps:
   providing an injection mould having the complementary features of the coupling element according to claim 1,
   injection moulding of the coupling element in the injection mould,
   cooling down of the coupling element and
   de-moulding the coupling element from the injection mould.

* * * * *